United States Patent [19]

Smith

[11] 4,036,911
[45] July 19, 1977

[54] PREPARATION OF GRAFT COPOLYMERS

[75] Inventor: Brian Howard Alfred Smith, Sarnia, Canada

[73] Assignee: Polymer Corporation Limited, Sarnia, Canada

[21] Appl. No.: 272,150

[22] Filed: July 17, 1972

Related U.S. Application Data

[63] Continuation-in-part of Ser. No. 88,517, Nov. 10, 1970, abandoned.

[30] Foreign Application Priority Data

Dec. 24, 1969 Canada .................................. 070816

[51] Int. Cl.$^2$ ................................................ C08L 9/06
[52] U.S. Cl. ............................. 260/880 R; 260/880 B
[58] Field of Search ....................... 260/880 R, 880 B

[56] References Cited

U.S. PATENT DOCUMENTS

| 3,431,323 | 3/1969 | Jones | 260/880 B |
| 3,485,894 | 12/1969 | Porter | 260/880 |
| 3,536,784 | 10/1970 | Skendrovich | 260/880 |

FOREIGN PATENT DOCUMENTS

| 1,002,902 | 9/1965 | United Kingdom | 260/880 |
| 1,109,681 | 4/1968 | United Kingdom | 260/880 |

Primary Examiner—Paul R. Michl
Attorney, Agent, or Firm—Stevens, Davis, Miller & Mosher

[57] ABSTRACT

Thermoplastic resins with good balance of physical properties are prepared by a two stage bulk or bulk-suspension polymerization process, using as reinforcing rubber a combination of a high 1,4-content polydiolefin and a polymer of a diolefin having a high percentage of the diolefin units in the 1,2-configuration.

10 Claims, No Drawings

PREPARATION OF GRAFT COPOLYMERS

This application is a continuation-in-part of copending application Ser. No. 88,517 filed Nov. 10, 1970, and now abandoned.

This invention relates to novel rubber-reinforced thermoplastic resins, and to a novel process for preparing such resins. More particularly, it relates to graft copolymers of a mixture of a vinyl aromatic, an acrylic nitrile and/or an alkyl ester of an acrylic acid on a rubbery polymer of a conjugated diolefin.

These resins are known in the art as "ABS" and "MBS" plastics and favorably combined the desirable properties of hardness, impact resistance, tensile strength, and good flow characteristics. A typical "ABS" resin might have a composition of 20% polybutadiene, 60% polymerized styrene units and 20% polymerized acrylonitrile.

The rubber-reinforced thermoplastic resins are normally prepared by emulsion graft copolymerization. In this process, an aqueous emulsion of the rubber and monomers is prepared, and graft copolymerization is initiated in the emulsion by means of free radical initiators. Such a process is, however, expensive to operate on a commercial scale, due at least in part to the need to employ emulsifiers.

Previous attempts to prepare ABS and MBS resins by the cheaper bulk or bulk-suspension polymerization process have yielded unsatisfactory resins. Whilst such resins have been prepared, their properties show certain deficiencies, notably in tensile strength and flexural strength. Thus, it has not been possible to prepare a range of grades of ABS and MBS resins having different properties, to meet all the requirements currently being met by emulsion polymerized ABS and MBS resins, by a bulk or bulk-suspension polymerized process. Apparently the inclusion of the additional polar grafting monomer, as compared with high impact polystyrene production, introduces complicating factors into the process.

An object of the present invention is to provide a bulk or bulk-suspension polymerization process for making ABS and MBS resins which at least reduces this disadvantage.

It has now been found that satisfactory ABS and MBS resins can be prepared by bulk or bulk-suspension polymerization process, provided that a mixture of certain polymers is used as the rubbery backbone for the graft copolymeric resin.

Thus according to the present invention, there is provided a process or preparing ABS and MBS resins, which comprises dissolving a mixture of preformed rubbery polymer A and preformed polymer B in a mixture of grafting monomer, prepolymerizing with agitation the solution so formed to a conversion of grafting monomers of from about 10% to about 40% whereby a dispersion is formed of a solution of said preformed polymers in a solution of a polymer of said grafting monomer, said solutions being solutions in the residual grafting monomer, and continuing the polymerization of the residual grafting monomer to at least 50% conversion, aid continued polymerization being carried out in bulk or in aqueous suspension under suspension conditions, and recovering the graft copolymerization product so formed, wherein polymer A is a high 1,4-content polydiolefin and polymer B is a polymer of butadiene-1,3 selected from homopolymers of butadiene-1,3 having at least about 50% of butadiene units in the 1,2 configuration and copolymers of butadiene-1,3 with less than 50% by weight of a copolymerizable monomer.

Preferred as polymer A is high-1,4-content polybutadiene, especially high cis-1,4-content polybutadiene. However, polybutadienes having a 1,4-content of at least 85% and cis-1,4-content of 35% and higher are also suitable, along with high cis-1,4-content polyisoprene.

Polymer B used in accordance with this invention is a low molecular weight polymer of butadiene-1,3 selected from homopolymers and block copolymers of butadiene with a copolymerizable alkenyl aromatic monomer such as styrene and alphamethylstyrene, the polymer B having at least about 50% and preferably at least about 80% of the butadiene units polymerized in the 1,2 configuration and having an intrinsic viscosity, measured in toluene at 30° C, of not more than 1 dl/g. The preferred block copolymers of alkenyl aromatic hydrocarbons and comjugated diolefins for use as polymer B are those derived from butadiene and styrene of alphamethylstyrene. Suitable preferred block copolymers include those of general form S-B-S, S-B/S, S-B/S-S, S-B-α and α-B-α where S represents a block of polysthrene, B represents a block of polybutadiene, B/S represents a copolymer block of butadiene and styrene, and α represents a block of polyalphamethylstyrene.

In the thermoplastic resins of the present invention, the proportions of grafting monomers and rubbers are generally similar to the proportions used in conventional, emulsion prepared ABS and MBS resins for the same purposes. Thus the total rubber content is generally within the range 5 to 30 weight per cent, preferably 10-25 weight %, the balance being the grafted monomers. The proportion of styrene (and/or its polymerizable homologues) to acrylonitrile, etc., is suitably of the order of 10:1 to 1:2 but preferably 3:1, so that the monomeric proportions of the product are within the approximate ranges, rubber 5 to 30 weight per cent, styrene, etc., 15 to 75 wieght per cent, and acrylonitrile, etc. 12 to 30 weight per cent.

In the process and products of the present invention, it is preferred that the ratio of polymer A to polymer B should be greater than 1:1 on a weight basis. Most preferably, the ratio is from about 10:1 to about 1.5:1.

As previously mentioned, prior attempts to produce such graft copolymeric resins by bulk or bulk-suspension polymerization processes led to the formation of resin with unsatisfactory properties. When polybutadiene alone is used as the reinforcing rubber, even the most preferred high cis-1,4-polybutadiene of polymer A of the present invention, resins with an unsatisfactory balance of properties such as tensile strength, flexural strength, impact strength, melt flow index are produced by the bulk suspension polymerization process. One or other of these properties cannot be improved by varying parameters such as relative monomer contents and polymerization conditions, without the sacrifice of other desirable properties of the resins. As will be shown in the specific examples which follow, the use of a rubber specified as polymer B in the present invention, alone, in a bulk suspension polymerization process, does not yield resins with a complete set of desirable properties. The combination of rubbers as previously set forth appears to be necessary for the preparation of satisfactory ABS and MBS resins by bulk or bulk-suspension polymerization techniques. The resins so produced according to the invention have properties comparable in all important respects to those of resins produced by emulsion polymerization techniques, and show considerable economic advantages over these latter.

The polymers useful as polymer A and polymer B in the present invention are known per se. Their methods of preparation are also known, and do not comprise a part of the present invention and so need not be described in detail here.

Similarly, the general process of bulk or bulk-suspension graft polymerization is known, and requires no great detail of description. In the first bulk polymerization stage, generally known as pre-polymerization, the rubbers are dissolved in the monomers, and polymerization of this solution ensues. The polymerization may be thermally initiated or initiated by decomposition of a suitable free-radical intiator In either case, polymerization takes place at elevated temperatures, e.g. from 50° to 120° C. Polymerization continues under agitation until phase inversion has occurred. This can be observed visually, since the viscosity of the reaction solution gradually increases, reaching a maximum just before the point of phase inversion, and then decreases quite suddenly. Phase inversion depends on the amount of rubber used and may occur for example at between 15% and 30% conversion of monomers. This stage is herewith referred to as pre-polymerization stage. It is important that phase inversion should be obtained during the pre-polymerization, to ensure that the final resin exhibits the required two phases for high impact strength. If desired, the pre-polymerization may be stopped or retarded by cooling the reaction mixture to room temperature.

For the suspension polymerization technique in the second stage of polymerization, modifier and further initiator may be dissolved in the reaction mixture, and the aqueous suspension medium is then added. In the process according to the present invention, an aqueous solution of polyvinyl alcohol is preferred as the suspension medium. Of course, other suitable suspension media can be used. Polymerization then proceeds at elevated temperatures, usually not less than about 50° C, until at least 50%, preferably at least 85% conversion of monomers is achieved. The reaction mixture is then cooled, and graft copolymeric products are isolated and recovered by vacuum stripping.

Alternatively, the pre-polymerized mixture can be polymerized to substantial completion in the absence of a dispersion medium or solvent, that is, in bulk. This second stage polymerization is usually carried out at temperatures of about 80° C to about 200° C. It can be done in the same reactor in which the mixture was pre-polymerized or preferably in a second reactor. Since the agitation is not required in this stage and the polymerization is carried out at about atmospheric pressure, a disposable container may serve as a suitable reactor. However, it is preferred to operate continuously using, for example, an extruder-polymerizer or a tower reactor. In the latter case, the pre-polymerized liquid mixture is fed into the top of the tower and moved gradually downwardly. As the grafting monomers are polymerized, the reaction temperature is gradually increased so that the polymerization proceeds at a reasonable rate and the reacting mixture is maintained liquid. The temperature increases from about 100° C at the top of the tower to about 200° C at the bottom. The substance issuing from the bottom of the tower is a molten polymer substantially completely polymerized and containing not more than about 10% volatiles.

The invention will be further described with 2. reference to specific examples.

EXAMPLE 1

In this example, a series of experiments, identified in Table I as 1, 2, 3, 8 and 9, was conducted to prepare ABS resins by bulk-suspension polymerization processes, using a mixture of high cis-1,4-content polybutadiene and low molecular weight high 1,2-content polybutadiene as the backbone polymers, in various relative proportions. In addition, two control experiments, 4C and 5C, were conducted in which these rubbers were each used individually. In a further control experiment 6C, a higher molecular weight 1,2-polybutadiene was employed as polymer B in the amount of 2 phm to 13 phm of polymer A as a comparison to the inventive experiment number 2 Yet another control experiment was performed wherein polymer B has a low molecular weight cis-1,4 polybutadiene employed at the 2 phm level.

The bulk pre-polymerization was carried out using a 2-litre capacity resin kettle provided with a water jacket equipped with heat transfer coils. The kettle was provided with a motor drive agitator with twin four blade turbine type impellers. The kettle was also provided with a reflux condenser, a sampling port and a temperature sensing and control device.

For the bulk pre-polymerization stage a solution of backbone polymers in styrene and acrylonitrile monomers was prepared at room temperature, of total volume about 600 mls. In each experiments 70/30 weight ratio of styrene to acrylonitrile was used. A small amount, 7.5 grams, of a conventional polymer antioxidant, a mixture of alkylated aryl phosphates was also added, for protective purposes. In each experiment 350 grams of styrene and 150 grams of acrylonitrile were used as the monomer mixture. The relative proportions of polymers varied from experiment to experiment. This reaction solution was charged to the resin kettle.

Then the free-radical initiator, 3.0 grams of lauroyl peroxide, was added and dissolved, and the reaction mixture was warmed to the polymerization temperature of 65° ± 4° C and maintained at this temperature while agitating vigorously, until after phase inversion had occurred (3 to 5 hours). This phase inversion point was determined visually, by observing the vicosity of the reaction mixture as previously outlined. After phase inversion, the pre-polymerization in most experiments was retarded by cooling the reaction mixture to room temperature.

The same apparatus was used for the suspension polymerizaton step. The modifier (2.0 grams of tertiary dodecyl mercaptan) and additional initiator (3.0 grams of lauroyl peroxide and 2.0 grams tertiary butyl perbenzoate) were first added to and dissolved in the reaction mixture. Then the suspension medium was added. This consisted of 1400 grams of water and 50 grams of a three weight % aqueous solution of polyvinyl alcohol. This suspension was vigorously agitated, warmed to the polymerization temperature of 65° ∓ 4° C for a period of about 6 hours to complete the polymerization. Normally the conversion achieved was about 90% under the conditions of this example.

The graft copolymer product was then recovered by separating the suspension beads from the aqueous serum by filtration. The beads were washed with hot and cold water and stripped with steam to remove all voltatile residues for 2 hours at above 97° C. Then the beads were dried in a vacuum oven in an atmosphere of nitrogen for three hours at 115° C. Suitable conventional stabilizers were dry blended with dried beads and then the beads were milled and chipped ready for physical testing.

In the experiments according to the invention a polybutadiene with a cis-1,4-content of 98% was used as one reinforcing polymer (polymer A). This polybutadiene was of high molecular weight and Mooney viscosity (M/L 4 at 100° C) of 37 and has been produced by solution polymerization using a cobalt based Ziegler catalyst. With the exception of experiments 6C and 7C, polymer B was a low molecular weight polybutadiene having a 1,2-content of 91% and an intrinsic viscosity of 0.60 measured in toluene at 30° C. In experiment 6C, polymer B was a high molecular weight polybutadiene having a 1,2 content of 85.6% and an intrinsic viscosity in toluene at 30° C of 5.79. In experiment 7C, the polymer B was a low molecular weight polybutadiene having a cis-1,4 content of 90% and an intrinsic viscosity in toluene at 30° C. of 0.565.

Testing of the resins was carried out in the well known manner. Bars of ¼ inch by ½ inch cross section were injection molded from the resin and subjected to strength tests in the manner known, per se. The Rockwell hardness was measured by the standard test procedure designated ASTM D 785-65, method A. The results are reported below as values on the "R" scale, in the normal way. The flow properties of resins were examined by measuring their melt flow index by the standard procedure, i.e. by measuring the grams of polymer which will flow through an orifice of diameter 0.0825 inches in 10 minutes, at a temperature of 220° C and under a load of 10 kilograms. The heat deflection temperature was measured according to ASTM procedure D 648Lk -56. The products were also analyzed for bound acrylonitrile content, as a check on the final chemical composition. The results of testing are given in Table I. The amounts of polymers A and B are recorded in parts by weight per 100 parts by weight of combined grafting monomers, i.e. parts per 100 parts by weight of styrene/acrylonitrile mixture.

experiments, and are included for comparative purposes.

It will be seen from the results reported in Table 1, that control experiment 4C, in which the sole reinforcing polymer was high 1,2-content polybutadiene, yielded a resin deficient in impact strength, both at room temperature and at low temperature, and also deficient in melt flow index, indicating a resin of quite unsatisfactory molding characteristics. Control experiment 5C, using only high cis-1,4-content polybutadiene, yielded a resin deficient in tensile strength, flexural strength and flexural modulus. The experiments according to the inventon, however, numbers 1 to 3, 8 and 9, yielded resins with satisfactory properties in all major respects. Whilst in some cases a melt flow index lower than that of resin from control experiment 5C was found, this is not serious, since the values are still satisfactory for normal commercial use. The substantial improvement in tensile strength and flexural strength of resins from experiments 1 to 3 as compared with the resins of experiment 5C, is particularly noteworthy.

Further from Table I, it will be seen that when a high molecular weight 1,2-polybutadiene is substituted for the low molecular weight polymer B, that is 6C versus 3, the two most critical properties, Izod impact strength and melt flow index are reduced significantly. Then in the case of control experiment 7C, where the polymer B is low molecular weight but lacking in 1,2-configuration of its microstructure, the test values show that while good melt flow is achieved the impact resistance falls to an inadequate value.

The test values of Table I thus show the superior technical advantage of using a low molecular weight high 1,2-polybutadiene as the polymer B in the ratio prescribed.

EXAMPLE 2

In this example, a series of experiments were conducted exactly as described in Example 1, except that polymer B, instead of being high 1,2-content polybutadiene, was a block copolymer of general form polyalphamethylstyrene-polybutadiene-polyalphamethylstyrene. This low molecular weight block copolymer had an intrinsic viscosity in toluene of 0.58 dl/g and an

TABLE I

| Experiment No. | 1 | 2 | 3 | 4C | 5C | 6C | 7C | 8 | 9 |
|---|---|---|---|---|---|---|---|---|---|
| Polymer A (phm) | 14.0 | 13.0 | 12.0 | — | 15 | 13.0 | 13.0 | 9.0 | 17.3 |
| Polymer B (phm) | 1.0 | 2.0 | 3.0 | 15 | — | 2.0* | 2.0** | 6.0 | 2.7 |
| Izod impact at 25° C (ft. lbs/inch) | 2.7 | 4.4 | 4.7 | 0.9 | 2.8 | 2.3 | 1.8 | 3.4 | 3.5 |
| at −34° C | 1.3 | 1.4 | 1.5 | 0.8 | 1.3 | 1.0 | 1.0 | 1.4 | 1.6 |
| Melt flow index (gms/10 min) | 18.5 | 15.0 | 13.5 | 4.8 | 19.5 | 8.4 | 22.5 | 13.2 | 8.0 |
| Tensile strength at yield (Kg/cm$^2$) | 475 | 480 | 460 | 500 | 380 | 425 | 440 | 438 | 356 |
| Flexural strength (Kg/cm$^2$) | 540 | 550 | 540 | 630 | 425 | 533 | 490 | 477 | 374 |
| Flexural Modulus (Kg/cm$^2$) | 20,200 | 21,650 | 21,500 | 22,350 | 17,050 | 20,703 | 19,350 | 17,817 | 14,826 |
| Rockwell R. Hardness | 101 | 101.5 | 103 | 108.5 | 93 | 101.5 | 104 | 103 | 90 |
| Heat deflection Temperature (° C) | 82 | 81 | 82 | 73 | 77 | not tested | 77 | 80 | 79 |
| Wt. % bound AcN | 21.8 | 21.6 | 21.35 | 20.95 | 20.7 | 20.5 | 19.85 | 21.0 | 20.0 |

*high mol. wt. polybutadiene 1, 2 configuration
**low mol. wt. cis-1,4 polybutadiene The experiments numbered 4C, 5C, 6C and 7C are of course control experiments, outside the scope of the present invention, one reinforcing polymer having been omitted in the case of experiments 4C and 5C, while in experiments 6C and 7C the polymer B is other than specified for the invention. They were carried out, and the resin tested, in exactly the same way as the other alphamethylstyrene content of 35 weight %.

The polybutadiene block contained 69% of monomer units in the 1,2-configuration. As in Example 1, polymer A was a high cis-1,4-content polybutadiene. The results of the experiments and tests on the products are recorded in Table II. For ease of comparison the results of control experiment 5C of Example 1 are repeated in Table II.

As in Table I, the same significant increase in the tensile strengths of the resins as compared with the control experiments is exhibited. The melt flow index of the resins of experiments 6 and 7 are lower than desired for some applications, and for this reason the embodiments of the invention exemplified in experiments 8, 9, 10 and 11 are preferred.

TABLE II

| Experiment No. | 6 | 7 | 8 | 9 | 10 | 11 | 5C |
|---|---|---|---|---|---|---|---|
| Polymer A (phm) | 14.25 | 14.0 | 13.5 | 13.0 | 12.0 | 9.0 | 15 |
| Polymer B (phm) | 0.75 | 1.0 | 1.5 | 2.0 | 3.0 | 6.0 | — |
| Izod impact at 25° C (ft. lbs/inch) | 4.8 | 5.9 | 4.6 | 3.9 | 2.8 | 2.6 | 2.8 |
| at − 34° C | 1.7 | 1.9 | 1.7 | 1.6 | 1.4 | 1.3 | 1.3 |
| Melt flow index (gms/10 min) | 7.8 | 6.7 | 14.5 | 14.5 | 18.6 | 21.0 | 19.5 |
| Tensile strength at yield (kg/cm$^2$) | 450 | 480 | 470 | 460 | 475 | 450 | 380 |
| Flexural strength (kg/cm$^2$) | 510 | 520 | 510 | 550 | 515 | 530 | 425 |
| Flexural modulus (kg/cm$^2$) | 21,200 | 20,700 | 20,850 | 22,650 | 21,200 | 22,000 | 17,050 |
| Rockwell R. Hardness | 97 | 101 | 99 | 107.5 | 101.5 | 101 | 93 |
| Heat deflection Temperature (° C) | 87 | 83 | 79 | 82 | 81 | 79 | 77 |
| Wt. % bound AcN | 21.2 | 21.55 | 21.5 | — | 21.6 | 21.3 | 20.7 |

What is claimed is:

1. A process for preparing an impact-resistant thermoplastic resin which comprises:
   a. dissolving 5–30 parts by weight of a mixture of preformed rubbery polymer A and preformed polymer B in 70–95 parts by weight of a mixture of grafting monomers, the weight ratio of polymer A to polymer B being greater than 1:1,
   b. prepolymerizing with agitation the mixture so formed to a conversion of grafting monomers of from about 10% to about 40% whereby a dispersion is formed of a solution of said preformed polymers in a solution of a polymer of said grafting monomers,
   c. continuing the polymerization of the residual grafting monomers to at least 50% conversion, said continued polymerization being carried out in bulk or in aqueous suspension, and
   d. recovering the thermoplastic resin so formed, wherein polymer A is an 85+% 1,4-content polybutadiene having a cis-1,4 content of at least 35%, and wherein polymer B is a low molecular weight polymer of butadiene-1,3 having at least about 50% of butadiene units in the 1,2-configuration and having an intrinsic viscosity in toluene at 30° C of not more than 1.0 dl/g, and said grafting monomers comprise a first monomer and a second monomer, the first monomer being a styrene or a polymerizable homologue of styrene, and the second monomer being selected from one or more of acrylonitrile polymerizable homologues of acrylonitrile, methyl methacrylate and polymerizable homologues of methylmethacrylate, the weight ratio of said first monomer to said second monomer being in the range of about 10:1 to 1:2.

2. The process of claim 1 wherein the weight ratio of polymer A to polymer B is from about 10:1 to about 1.5:1.

3. The process as claimed in claim 2 in which polymer A is a high cis-1,4-content polybutadiene.

4. The process as claimed in claim 2 in which polymer B is a low molecular weight homopolymer of butadiene-1,3 having a 1,2 content of at least 80%.

5. The process as claimed in claim 2 in which polymer B is a low molecular weight block copolymer of butadiene-1,3 and styrene or alphamethylstyrene.

6. The process as claimed in claim 1 in which said continued polymerization is carried out in an aqueous suspension medium to a conversion of at least 85%.

7. An improved impact-resistant thermoplastic resin comprising from:
   a. 15 to 75 weight % of a first copolymerized monomer selected from styrene, polymerizable homologues of styrene, and mixtures thereof, and
   b. from 12 to 30 weight % of a second copolymerized monomer selected from acrylonitrile, polymerizable homologues of acrylonitrile, methyl methacrylate, polymerizable homologues of methyl methacrylate and mixtures thereof, graft copolymerized onto
   c. from about 5 to about 30 weight % of a mixture of two flexible polymers,
      i. one of said flexible polymers being a polybutadiene having a 1,4-content of at least 85% and a cis-1,4 content of at least 35%, and
      ii. the other of said flexible polymers being a polymer of butadiene-1,3 having at least 50% of butadiene units in the 1,2 configuration and having an intrinsic viscosity in toluene at 30° C of not more than 1.0 dl/g, the ratio of polymer (i) to polymer (ii) being greater than 1:1 by weight.

8. The thermoplastic resin as claimed in claim 7 in which the amount of the flexible polymers is from 10 to 25 weight %.

9. The thermoplastic resin as claimed in claim 7 in which the other flexible polymer is a low molecular weight homopolymer of butadiene-1,3 having a 1,2-content of at least 80%.

10. The thermoplastic resin as claimed in claim 7 in which the other flexible polymer is a low molecular weight block copolymer of butadiene-1,3 and styrene or alphamethylstyrene.

* * * * *